No. 820,202. PATENTED MAY 8, 1906.

J. Q. A. JOHNSTON.

PLOW.

APPLICATION FILED DEC. 1, 1905.

3 SHEETS—SHEET 1.

WITNESSES:

John J. Kittle

Fred Acker

INVENTOR

John Q. A. Johnston

BY Munn & Co

ATTORNEYS

ANDREW. B. GRAHAM CO., PHOTO-LITHOGRAPHERS, WASHINGTON, D. C.

No. 820,202. PATENTED MAY 8, 1906.

J. Q. A. JOHNSTON.

PLOW.

APPLICATION FILED DEC. 1, 1905.

3 SHEETS—SHEET 2.

WITNESSES:

INVENTOR

John Q. A. Johnston

BY

ATTORNEYS

ANDREW B. GRAHAM CO., PHOTO-LITHOGRAPHERS, WASHINGTON, D. C.

No. 820,202. PATENTED MAY 8, 1906.

J. Q. A. JOHNSTON.

PLOW.

APPLICATION FILED DEC. 1, 1905.

3 SHEETS—SHEET 3.

WITNESSES:

John J. Kittle

[signature]

INVENTOR

John Q. A. Johnston

BY Munn & Co

ATTORNEYS

ANDREW. B. GRAHAM CO., PHOTO-LITHOGRAPHERS, WASHINGTON, D. C.

UNITED STATES PATENT OFFICE.

JOHN Q. A. JOHNSTON, OF NEWBURYPORT, MASSACHUSETTS.

PLOW.

No. 820,202. Specification of Letters Patent. Patented May 8, 1906.

Application filed December 1, 1905. Serial No. 289,791.

*To all whom it may concern:*

Be it known that I, JOHN Q. A. JOHNSTON, a citizen of the United States, and a resident of Newburyport, in the county of Essex and State of Massachusetts, have invented a new and Improved Plow, of which the following is a full, clear, and exact description.

The purpose of the invention is to provide a rotary plow adapted to be drawn over the ground instead of through the ground, as customary, in the construction of which plow a rotary holder is employed carrying a number of independently-operating blades arranged in rows, one blade in a row being staggered in relation to the others, whereby the blades have a spading operation on the soil in the operation of the plow.

Another purpose of the invention is to so construct the plow that the blades will yield should they strike an obstruction, and thus lessen the danger of the blades being broken in stony ground.

Another object of the invention is to provide means whereby the blades are interchangeable, enabling different blades to be used in connection with the rotary plow best adapted to different kinds of soil.

A further object of the invention is to provide a plow of the character described which will be simple, durable, and economic and which while very strong can yet be made very light.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
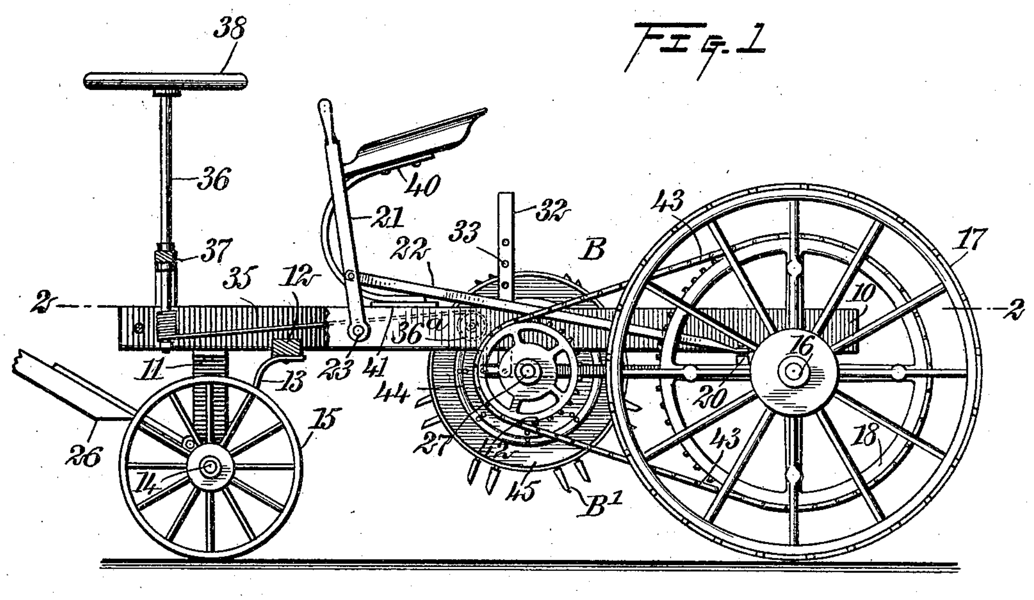
Figure 2:
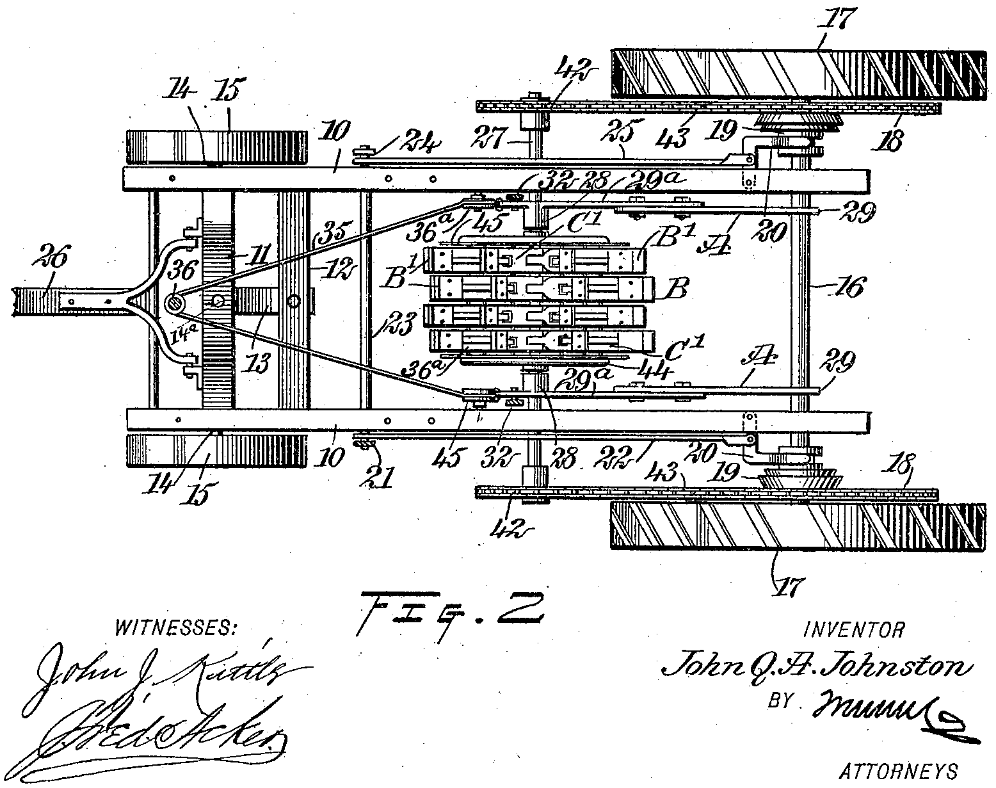
Figure 3:
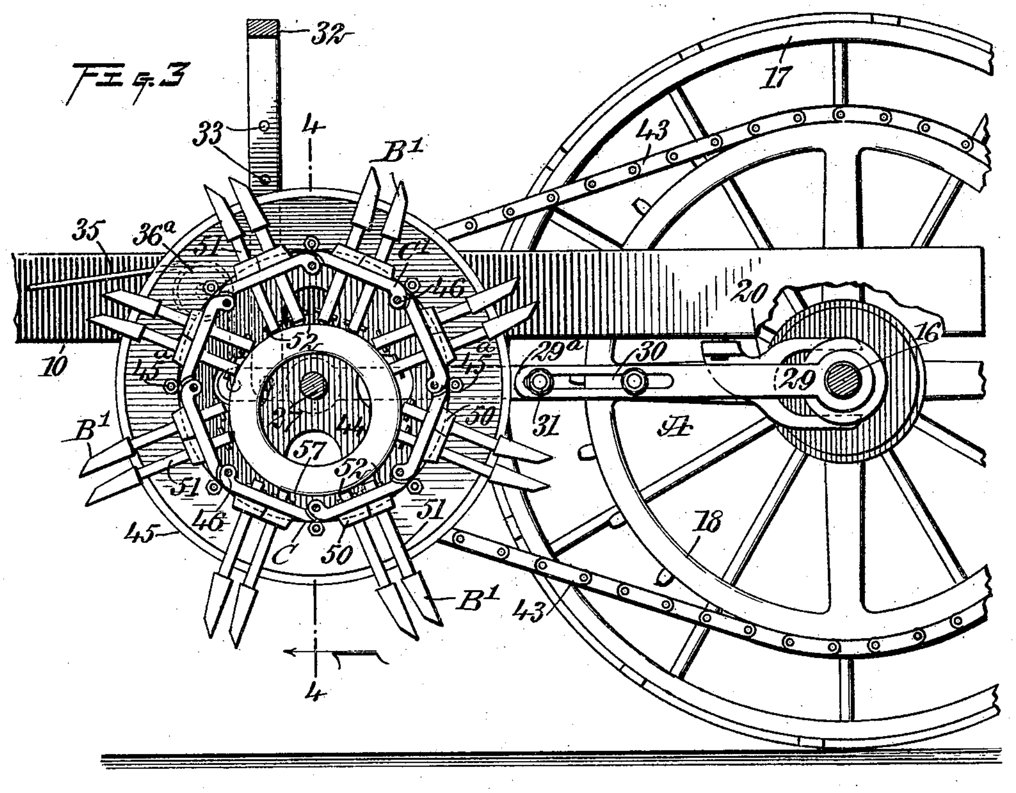
Figure 4:
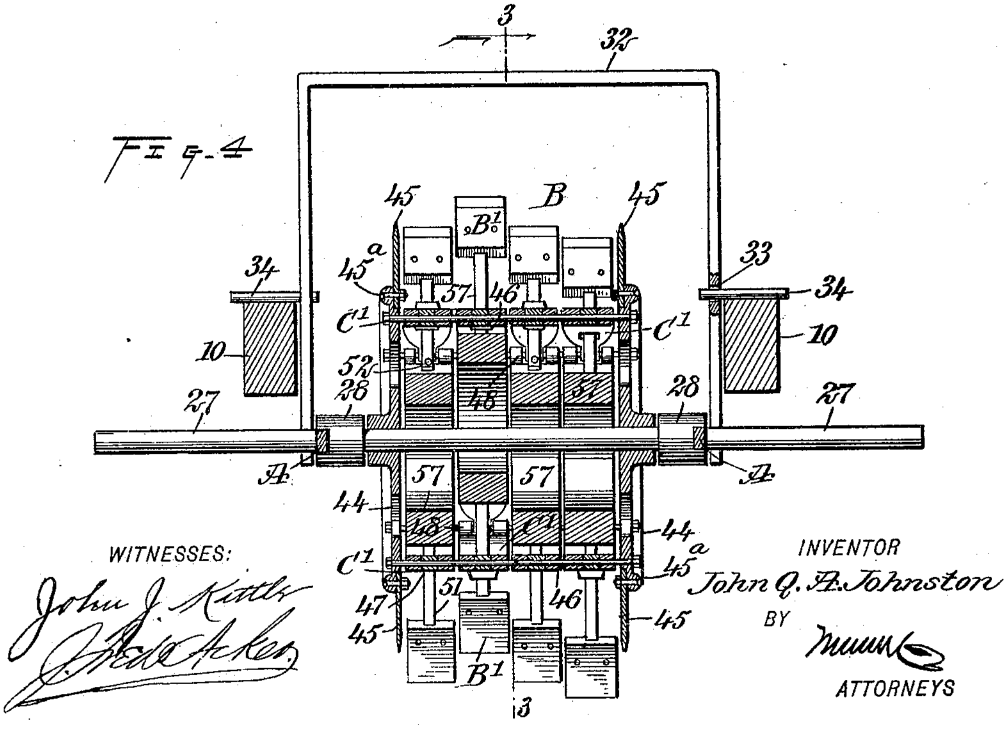
Figure 5:
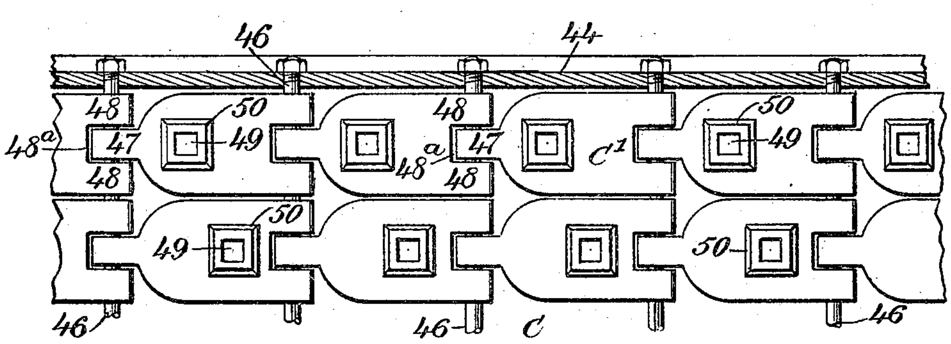
Figure 6:
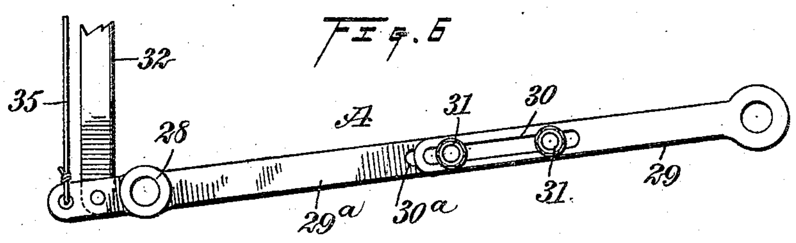
Figure 7:
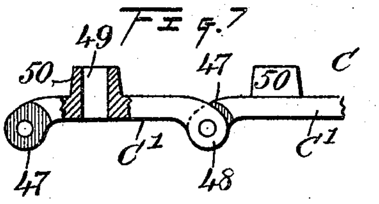
Figure 8:
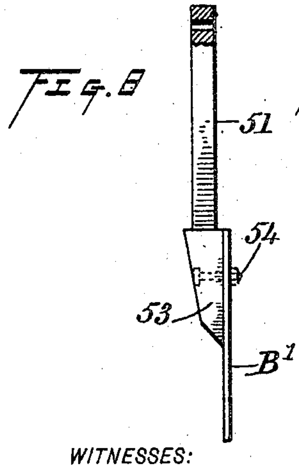
Figure 9:
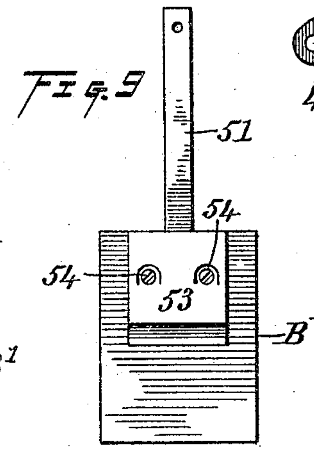
Figure 10:
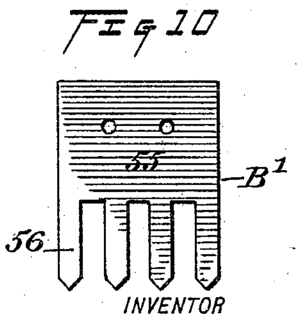

Figure 1 is a sectional side elevation of the improved implement. Fig. 2 is a sectional plan view, the section being taken substantially on the line 2 2 of Fig. 1. Fig. 3 is an enlarged vertical longitudinal section taken practically on the line 3 3 of Fig. 4. Fig. 4 is an enlarged vertical transverse section taken substantially on the line 4 4 of Fig. 3. Fig. 5 is a diagrammatic plan view of a portion of the holder for the plow-blades, illustrating in detail the construction of the direct supports for the shanks of the blades and the manner in which the supports are located in the holder. Fig. 6 is a detail side elevation of one of the supporting-arms for the plow, showing the means for raising the arms to elevate or lower the plow. Fig. 7 is a detail view of a few of the supports shown in Fig. 5, one support being in sectional side elevation and the other support in side elevation. Fig. 8 is an edge view of one of the blades and the shank for the same, illustrating the detachable connection between the blade and the shank. Fig. 9 is a rear elevation of the blade shown in Fig. 8, and Fig. 10 is a front view of another construction of blade.

The frame of the implement usually consists of parallel side beams 10, which are connected at the front by a bolster 11 and a cross-bar 12, from the central portion of which cross-bar 12 a bracket-support 13 is carried downward and forward to an engagement with the bottom portion of the bolster, and the forward axle 14 is pivotally connected in any suitable or approved manner—for example, by a king-bolt 14ª—to the said bolster. The said forward axle 14 is provided with supporting-wheels 15.

A rear axle 16 is secured to suitable hangers carried down from the rear portions of the side beams 10 of the frame, and at the ends of said rear axle 16, which extend farther beyond the sides of the frame than the forward axle 14, supporting-wheels 17 are loosely mounted, the said supporting-wheels 17 being very much larger than the forward wheels 15, and said supporting-wheels 17 are provided with a wide roughened tread-surface.

The inner portions of the hubs of the rear supporting-wheels 17 are provided with clutch-faces adapted to engage similar faces on driving sprocket-wheels 18, loosely mounted on the rear axle 16 outside of the frame of the machine, and at the inner faces of the hubs of the said driving-sprockets 18 sleeves 19 are formed, which are engaged by the forked ends of angle-levers 20, pivoted to the side beams 10 of the frame, whereby to carry the driving-sprockets 18 into or out of locking engagement with the rear supporting-wheels 17. This action is accomplished through the medium of a hand-lever 21, located at the left-hand side of the frame and connected by a link or bar 22 with the left-hand shifting-lever 20, as in shown in Fig. 2. The said hand-lever 21 is secured to a shaft 23, which is mounted to turn in the frame of the machine adjacent to its forward portion, and at the right-hand end of the shaft 23 an arm 24 is secured. This arm 24 is connected by a bar or link 25 with the right-hand shifting-lever 20 for the right-hand driving-sprocket 18. I desire it to be understood that the positions of the shaft 23 and the arm 24 may be reversed, if desired.

A shaft 27, adapted to carry the plow B, to be hereinafter described, is located about centrally of the under portion of the frame of the machine, but is independent of the said frame, being adapted to be raised and lowered as required. This driving-shaft 27 for the plow B is journaled in bearings 28 in the forward end portions of supporting-arms A, one of which is shown in detail in Fig. 2. These supporting-arms A at their rear ends are mounted to turn upon the rear axle 16. The supporting-arms A are constructed in two sections 29 and 29[a], the section 29 being provided with a longitudinal slot 30 and the section 29[a] with a corresponding slot 30[a], and bolts 31 are passed through these slots, provided with nuts at their outer ends, so that the said supporting-arms may be lengthened or shortened as occasion may demand and for a purpose to be hereinafter described.

The supporting-arms A at their forward ends are pivotally connected with the vertical members of a yoke 32, (shown best in Fig. 4,) and the vertical members of the said yoke 32 are provided with series of apertures 33, which apertures are adapted to receive pins 34, said pins 34 being adapted to rest upon the upper faces of the side beams 10 of the frame so as to support the shaft 27 and the plow B, carried thereby, in a fixed upper or lower position; but the said shaft 27 may be raised and lowered while the apparatus is in action in the following manner: A rope or chain 35 is attached to the forward end of each of the supporting-arms A, and this chain or rope 35 is carried upward over pulleys 36[a], mounted to turn at the inner face of the beams 10 of the frame, as is shown in Figs. 1 and 2. This rope or chain 35 is wound around the lower end of a vertical shaft 36, held to turn in suitable bearings 37 at the forward portion of the frame, and the said shaft 36 is preferably provided with a hand-wheel 38 at its upper end, so that the shaft 36 may be readily operated by the driver to raise and lower the plow as occasion may demand. The driver's seat 39 is supported by a spring-standard 40 of any approved type, secured to the cross-bar 41 at the forward portion of the frame back of the hand-lever 21, so that the said hand-lever may be within easy reach of the driver.

A sprocket-wheel 42 is secured to each end of the drive-shaft 27 for the plow, which sprocket-wheels 42 are much smaller than the driving-sprockets 18, and the sprocket-wheels 42 are connected with the driving-sprockets 18 by means of chain belts 43, so that when the driving-sprockets 18 are in clutch connection with the rear wheels 17 of the implement the driving-shaft 27 is revolved, the said shaft 27 being inactive when the said driving-sprockets 18 are carried out of engagement with the aforesaid rear driving-wheels 17 of the implement. The reason for making adjustable the supporting-arms A for the driving-shaft 27 is to take up the slack in the chains 43 which might occur, or to lengthen the said chains when the shaft 27 is adjusted up or down to bring the plow B, carried thereby, nearer to or farther from the surface of the ground.

In the construction of the rotary plow two circular heads 44 are provided, made as light as possible consistent with strength, which heads are secured to the drive-shaft 27, and each head is provided with an outer marginal continuous circular knife 45, secured thereto by suitable bolts or rivets 45[a]. These heads are connected by rods 46, having suitably-applied nuts, as is shown in Fig. 4, and said bolts constitute the pivot-pins of links C′ of an endless circular chain C. The links C′ are in transverse as well as in longitudinal series, the number of links in a transverse rod or series being two or more, usually four in number. The links C′ are inwardly curved at their ends, and each link is provided with a single central knuckle 47 at one end and two knuckles 48 at the other end, separated by a space 48[a], and the single knuckle of one link in a longitudinal series of links is made to enter the space 48[a] between the knuckles 48 of the next link, a rod 46 being loosely passed through the connecting-links, as is shown in Figs. 4 and 5.

Each link C′ is provided with a polygonal opening 49, surrounded by a correspondingly-shaped collar 50, which collar is produced upon the outer face of a link, as is shown in Figs. 5 and 7. The openings 49 are staggered with relation to each other in each transverse row or series of links, as is best shown in Fig. 5, and, as is illustrated in Figs. 3 and 4, each opening 49 in a link is adapted to loosely receive a polygonal shank 51 of a digging-blade B′. Therefore, the said shanks 51 have sliding or end movement in their carrying or supporting links C′, but are prevented from entirely leaving or dropping from their carrying-links by pins 52 or their equivalents, passed through the inner ends of the shanks, as is best shown in Fig. 3. The digging-blades B′ are interchangeably connected with the shanks 51, as the said shanks are preferably provided with wide foot-sections 53, which foot-sections are attached to the back portions of the blades B′ by screws 54 or like devices, having their heads countersunk, as is shown in Figs. 8 and 9.

The form of the blades B′ may be varied according to the character of the soil they are expected to work. For example, the blades B' may be spade-like in formation, as is shown in Figs. 8 and 9, or the said blades may consist of a flat body 55 and tines 56 integral with or attached to the said body, as is shown in Fig. 10.

In connection with each longitudinal series of links C' in the chain of links C a ring 57 is employed, and these rings, as is shown in Figs. 3 and 4, loosely receive the drive-shaft 27 of the plow, so that in the operation of the machine these rings assume an eccentric position relative to the said shaft, as is illustrated in Fig. 3. The said rings 57 bear upon the inner ends of the shanks 51 of the blades of the plow when the said blades are in their lowest position, as is shown in Fig. 1, compelling the blades to enter the ground, but as the plow revolves and the blades ascend they drop down also to an engagement with the side and upper portions of the said rings, as is also shown in Fig. 3. Thus it will be observed that the shanks of the blades have free movement in the carrying or supporting chain C, forming a portion of the plow, and that should any blade in action meet with an obstruction that particular blade can be forced upward, lifting its controlling-ring 57, as is shown in Fig. 4, permitting the said blade to pass by the obstruction uninjured and without interfering with the digging action of the other blades.

It will be understood that the shaft 36 may be provided with any approved mechanism for holding it in its set position and that by operating the shaft 36, the pins 34 having been withdrawn from the yoke 33, the plow can be raised or lowered at the option of the operator, and such action will be accomplished conveniently and expeditiously.

For taking the plow to or from the field said plow is elevated by the operation of the shaft 36 and is held in its elevated position by pressing the pins 34, above described, through the yoke 32 to a bearing against the upper surfaces of the side pieces 10 of the frame, as is shown in Fig. 4.

This implement in its entirety is exceedingly simple in construction, effective in operation, and is light of draft and can be operated with the least possible amount of exertion on the part of the driver.

In Figs. 3 and 4 it is clearly shown that the chain C of links C' is fixedly located between the heads 44 and that the said chain C makes the circle of the drive-shaft 27 and is concentric with said shaft. The links that form the apron over the cylinder represent the width that the plow cuts as each tooth or knife cuts the same width as that of the link that holds it.

Having thus described my invention, I claim as new and desire to secure by Letters Patent—

1. In agricultural implements, a wheel-supported frame, a shaft operated by the movement of the supporting-wheels of the frame, and a plow operatively carried by said shaft, which plow consists of opposing heads, an endless chain fixedly carried by the heads, concentric with the shaft, a ring eccentric to the shaft and having free movement thereon, and blades the shanks of which have end movement in the links and are engaged by the said ring.

2. In agricultural implements, a wheel-supported frame, a shaft operated by the movement of the supporting-wheels of the frame, and a rotary plow secured to said shaft, consisting of opposing heads, an endless circular chain of links held concentric with the shaft between the heads, which links are in longitudinal and transverse series, rings loosely mounted on the shaft, one for each longitudinal series of links, which rings are eccentric to the shaft and are within the circle of the links, digging-blades, and shanks for the blades, which shanks have sliding movement in the links and at their inner ends engage the said rings.

3. In agricultural implements, a wheel-supported frame, a shaft operated by the movement of the supporting-wheels of the frame, and a rotary plow secured to the said shaft, which plow consists of opposing heads provided with circular marginal cutting-blades, an endless circular chain of links held concentric with the shaft between its heads, which links are in longitudinal and transverse series, each link in the chain being provided with an opening, the openings in the transverse series of links being in staggered order, independent rings loosely mounted on the shaft within the circle of the said links, a ring being provided for each longitudinal series of links, digging-blades, and shanks for the blades, which shanks are loosely passed through the openings in the said links and have bearing at their inner ends upon the said rings.

4. In agricultural implements, a wheel-supported frame, a shaft operated by the movement of the wheel-supported frame, and a rotary plow secured to the said shaft, consisting of opposing heads secured to the shaft, circular cutters secured to the outer marginal portion of each head, a chain of links carried by the said heads at a point adjacent to their outer margins, the said chain of links being concentric to the said shaft and comprising longitudinal and transverse series of links, each link being provided with an opening surrounded by a collar located at the outer face of the links, the openings in the transverse series of links being staggered with relation to each other, independent rings, one being provided for each longitudinal series of links, which rings have play upon the said shaft and are eccentric thereto, shanks mounted to slide in the openings of the said links, the inner ends of which shanks are engaged by the said rings, stops at the inner ends of the said shanks, and blades removably attached to the outer ends of the said shanks.

5. In agricultural implements, a wheel-supported frame, a shaft operated by the movement of the wheel-supported frame, and a rotary plow secured to said shaft, consisting of opposing heads secured to the shaft, circular cutters secured to the outer marginal portion of each head, a chain of links carried by the said heads at a point adjacent to their outer margins, the said chain of links being concentric to the said shaft and comprising longitudinal and transverse series of links, each link being provided with an opening surrounded by a collar located at the outer face of the links, openings in the transverse series of links being staggered with relation to each other, independent rings, one being provided for each longitudinal series of links, which rings have play upon the said shafts and are eccentric thereto, shanks mounted to slide in the openings of the said links, the inner ends of which shanks are engaged by the said rings, stops at the inner ends of the said shanks and blades removably attached to the outer ends of the said shanks, and means for throwing the plow-shaft into and out of operative connection with the supporting-wheels of the frame, and means for raising and lowering the said plow-shaft and adjustably supporting the same.

In testimony whereof I have signed my name to this specification in the presence of two subscribing witnesses.

JOHN Q. A. JOHNSTON.

Witnesses:

JOSEPH C. RICHARDSON,

THOMAS HUMPHREYS.